(12) United States Patent
Seo et al.

(10) Patent No.: US 9,461,794 B2
(45) Date of Patent: Oct. 4, 2016

(54) METHOD AND APPARATUS FOR TRANSMITTING SOUNDING REFERENCE SIGNALS IN WIRELESS COMMUNICATION SYSTEMS

(71) Applicant: LG ELECTRONICS INC., Seoul (KR)

(72) Inventors: Dongyoun Seo, Anyang-si (KR); Bonghoe Kim, Anyang-si (KR); Yunjung Yi, Anyang-si (KR); Joonkui Ahn, Anyang-si (KR); Suckchel Yang, Anyang-si (KR); Daesung Hwang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 30 days.

(21) Appl. No.: 14/389,969

(22) PCT Filed: Apr. 3, 2013

(86) PCT No.: PCT/KR2013/002766
§ 371 (c)(1),
(2) Date: Oct. 1, 2014

(87) PCT Pub. No.: WO2013/151327
PCT Pub. Date: Oct. 10, 2013

(65) Prior Publication Data
US 2015/0071206 A1  Mar. 12, 2015

Related U.S. Application Data

(60) Provisional application No. 61/619,932, filed on Apr. 3, 2012, provisional application No. 61/802,745, filed on Mar. 18, 2013.

(51) Int. Cl.
*H04L 5/00* (2006.01)
*H04W 74/08* (2009.01)
*H04L 25/02* (2006.01)

(52) U.S. Cl.
CPC .......... *H04L 5/0048* (2013.01); *H04L 5/0051* (2013.01); *H04L 5/0053* (2013.01); *H04L 5/0091* (2013.01); *H04L 25/0226* (2013.01); *H04W 74/0833* (2013.01); *H04L 5/0007* (2013.01)

(58) Field of Classification Search
None
See application file for complete search history.

(56) References Cited

U.S. PATENT DOCUMENTS

2009/0181687 A1    7/2009   Tiirola et al.
2010/0103902 A1    4/2010   Kim et al.
2011/0268087 A1*   11/2011  Kwon .................. H04L 5/0005
                                                370/331

(Continued)

OTHER PUBLICATIONS

Huawei, et al., "Remaining Open Issues on Simultaneous PUCCH/PUSCH/SRS Transmission," 3GPP TSG RAN WG1 Meeting #63bis, R1-110414, Jan. 2011, 6 pages.

(Continued)

*Primary Examiner* — Robert C Scheibel
(74) *Attorney, Agent, or Firm* — Lee Hong Degerman Kang & Waimey; Jonathan Kang; Jeffrey Lotspeich

(57) ABSTRACT

The present invention relates to a method and apparatus for transmitting sounding reference signals in wireless communication systems. The method includes the steps of: receiving sounding reference signal (SRS) setting information indicating an SRS transmitting scheme for an uplink carrier; and transmitting the SRS in the SRS transmitting scheme determined on the basis of the SRS setting information, wherein the SRS transmitting scheme is intended for transmitting the SRS in all of the bands of the uplink carrier, or in some of the bands of the uplink carrier.

6 Claims, 12 Drawing Sheets

(56) References Cited

U.S. PATENT DOCUMENTS

| | | | |
|---|---|---|---|
| 2012/0113967 A1* | 5/2012 | Smith | H04B 1/7143 370/338 |
| 2012/0213146 A1* | 8/2012 | Liu | H04J 11/0053 370/312 |
| 2013/0028138 A1* | 1/2013 | Hao | H04L 5/0051 370/254 |
| 2014/0211740 A1* | 7/2014 | Berggren | H04L 5/0048 370/329 |

OTHER PUBLICATIONS

ASUSTeK, "Collision of Msg3 transmission and UE-specific Aperiodic SRS subframe," 3GPP TSG RAN WG1 Meeting #66, R1-112594, Aug. 2011, 3 pages.

Huawei, et al., "Simultaneous transmission of SRS and PUCCH," 3GPP TSG RAN WG1 Meeting #67, R1-114086, Nov. 2011, 4 pages.

PCT International Application No. PCT/KR2013/002766, Written Opinion of the International Searching Authority dated Jul. 26, 2013, 1 page.

* cited by examiner

METHOD AND APPARATUS FOR TRANSMITTING SOUNDING REFERENCE SIGNALS IN WIRELESS COMMUNICATION SYSTEMS

CROSS-REFERENCE TO RELATED APPLICATIONS

This application is the National Stage filing under 35 U.S.C. 371 of International Application No. PCT/KR2013/002766, filed on Apr. 3, 2013, which claims the benefit of U.S. Provisional Application Ser. No. 61/619,932, filed on Apr. 3, 2012 and 61/802,745, filed on Mar. 18, 2013, the contents of which are all hereby incorporated by reference herein in their entirety.

BACKGROUND OF THE INVENTION

1. Field of the Invention

The present invention relates to wireless communication and more particularly, to a method and an apparatus for transmitting sounding reference signals in a wireless communication system.

2. Related Art

The 3$^{rd}$ Generation Partnership Project (GPP) Long Term Evolution (LTE)/LTE-A (Advanced) refers to wireless communication system specifications. In the LTE/LTE-A system, a Sounding Reference Signal (SRS) is transmitted to measure a uplink channel through which a user equipment transmits a signal to a base station.

In the uplink transmission, a control channel, Physical Uplink Control Channel (PUCCH), and a data channel, Physical Uplink Shared Channel (PUSCH) can be transmitted. The PUCCH is transmitted at the both edges of an allocated frequency band, and the PUSCH is transmitted from within the both frequency bands to which the PUCCH is transmitted.

Meanwhile, a carrier with a new structure not taking account of backward compatibility with existing cells (which is called a New Carrier Type (NCT)) is considered for use in future wireless communication systems. For example, in case an existing cell transmits a cell-specific reference signal (which is called a Cell-specific Reference Signal (CRS)) at each subframe during downlink transmission; and a synchronization signal, a broadcast channel, and a PDCCH are transmitted, the NCT used for the downlink can transmit the CRS at particular times rather than each subframe; and the structure of the synchronization signal, the broadcast channel, and the PDCCH can be configured differently.

In particular, a downlink NCT can be used mostly for data transmission, and in this case, the downlink NCT can reduce control channels such as the PDCCH. In the case of a uplink NCT corresponding to the aforementioned downlink NCT, transmission of a PUCCH may not be employed.

A conventional SRS has been designed to handle PUCCH transmission. In other words, the SRS has been defined to be transmitted in the frequency band of a uplink carrier, not including the frequency band in which the PUCCH is transmitted. Therefore, in case a conventional SRS transmission method is applied the same with respect to a carrier which does not deal with the PUCCH transmission such as the NCT or a uplink carrier corresponding to the NCT, SRS transmission may not be carried out in some frequency domain.

SUMMARY OF THE INVENTION

An object of the present invention is to provide a method and an apparatus for transmitting sounding reference signals in a wireless communication system.

One aspect of the present invention provides a method for transmitting sounding reference signals in a wireless communication system. The method is characterized in that it receives SRS configuration information indicating an SRS transmission method with respect to a uplink carrier; and the SRS transmission method transmits an SRS according to the SRS transmission method determined based on the SRC configuration information, where the SRS transmission method transmits the SRS across the whole frequency band of the uplink carrier or transmits the SRS in a part of the frequency band of the uplink carrier.

Another aspect of the present invention provides an apparatus for transmitting a sounding reference signal. The apparatus comprises an Radio Frequency (RF) unit transmitting and receiving a radio signal; and a processor connected to the RF unit, where the processor receives SRS configuration information indicating an SRS transmission method with respect to a uplink carrier; and transmits an SRS according to the SRS transmission method determined based on the SRS configuration information, where the SRS transmission method transmits the SRS across the whole frequency band of the uplink carrier or transmits the SRS in a part of the frequency band of the uplink carrier.

The present invention can transmit an SRS in an effective manner in a wireless communication system employing NCT which does not provide backward compatibility with existing carriers. Therefore, channel measurement with respect to a uplink frequency band can be performed more accurately, and thus system efficiency can be improved.

DESCRIPTION OF EXEMPLARY EMBODIMENTS

The 3rd Generation Partnership Project (3GPP) Long Term Evolution (LTE) specifications form part of the Evolved UMTS (E-UMTS) employing the Evolved-UMTS Terrestrial Radio Access Network (E-UTRAN), which employ Orthogonal Frequency Division Multiple Access (OFDMA) for downlink transmission while Single Carrier-Frequency Division Multiple Access (SC-FDMA) for uplink transmission. The LTE-A (Advanced) is the advanced form of the 3GPP LTE. In what follows, the present invention is described primarily with respect to the 3GPP LTE/LTE-A for the clarity of description, but the technical principles of the present invention are not limited to the above.

A wireless communication system includes at least one base station (BS). Each base station provides a communication service across a particular geographic region. A base station usually refers to a fixed station communicating with a UE and is also called an evolved NodeB (eNB), a Base Transceiver System (BTS), an access point, or an Access Network (AN).

A User Equipment (UE) can be stationary or mobile. The UE can also be called a Mobile Station (MS), User Terminal (UT), Subscriber Station (SS), wireless device, Personal Digital Assistant (PDA), wireless modem, handheld device, or Access Terminal (AT).

In what follows, a downlink (DL) transmission refers to communication from a base station to a UE, and a uplink (UL) transmission refers to communication from a UE to a base station.

A wireless communication system may be a system supporting bi-directional communication. Bi-directional communication can be carried out in a Time Division Duplex (TDD) mode or a Frequency Division Duplex Mode (FDD) mode. The TDD mode uses disparate time resources on the same frequency resource for the uplink and the downlink transmission. The FDD mode uses different frequency resources for the uplink and the downlink transmission. The base station and the UE can communicate with each other by using a radio resource called a radio frame.

Figure 1:
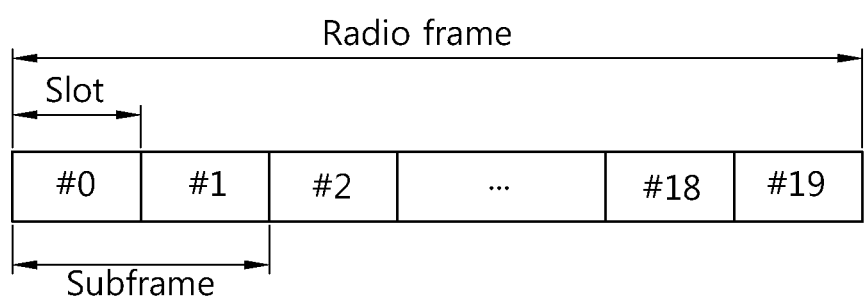
FIG. 1 illustrates a radio frame structure 1.

FIG. 1 illustrates a radio frame structure 1.

With reference to FIG. 1, the radio frame 1 consists of 10 subframes in the time domain, and each subframe consists of two slots in the time domain. Length of each subframe can amount to 1 ms, and length of each slot can be 0.5 ms. The time period needed to transmit one subframe is called a Transmission Time Interval (TTI). TTI can be the smallest unit of scheduling.

One slot comprises multiple Orthogonal Frequency Division Multiplexing (OFDM) symbols in the time domain. Since the 3GPP LTE employs OFDMA for downlink transmission, an OFDM symbol represents one symbol period. An OFDM symbol may be called differently according to the type of multiple access method. For example, in case SC-FDMA is used for a uplink multiple access method, the OFDM symbol may be called an SC-FDMA symbol. Though the figure illustrates a case where one slot comprises 7 OFDM symbols, the number of OFDM symbols included in one slot can be changed according to the length of a Cyclic Prefix (CP). According to the 3GPP TS 36.211 V8.5.0 (2008-12), one subframe comprises 7 OFDM symbols for the case of a normal CP, while one subframe comprises 6 OFDM symbols for the case of an extended CP. The structure of the radio frame is only an example, and the number of subframes included in a radio frame and the number if slots included in a subframe can be changed in various ways. In what follows, the radio frame structure 1 can be called an FDD frame for short.

Figure 2:
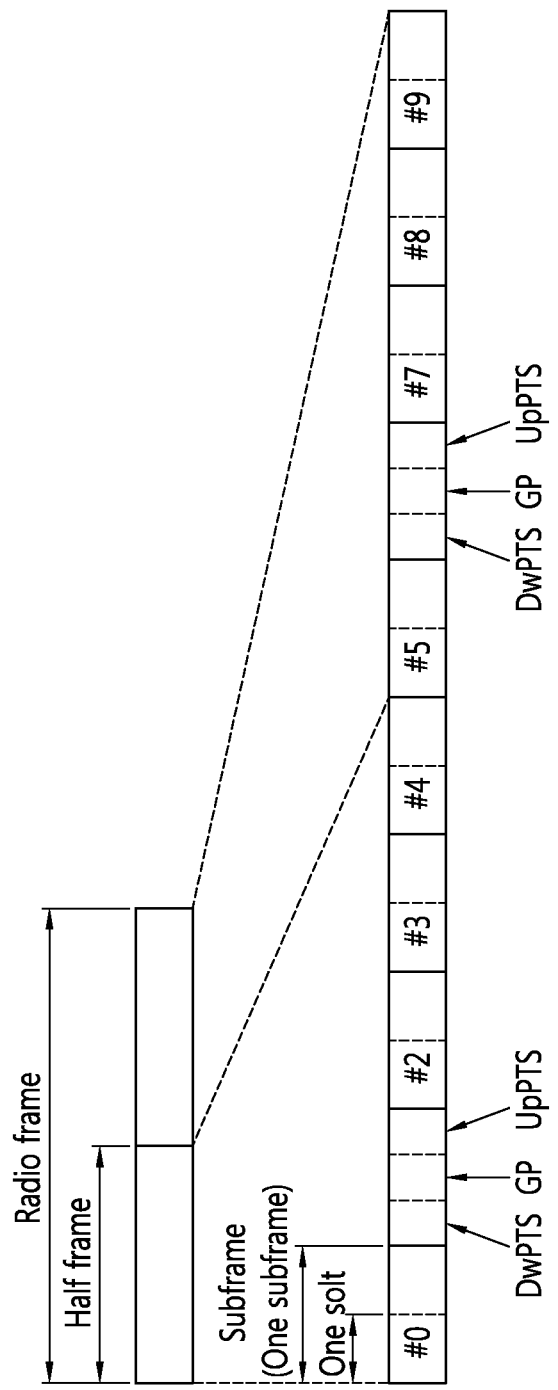
FIG. 2 illustrates a radio frame structure 2.

FIG. 2 illustrates a radio frame structure 2. The radio frame structure 2 can be called a TDD frame.

With reference to FIG. 2, a TDD frame comprises two half-frames and a total of 10 subframes. In case the 10 subframes of the TDD frame are index from 0, the subframes indexed with #1 and #6 can be special subframes, and the special subframes include a Downlink Pilot Time Slot (DwPTS), a Guard Period (GP), and a Uplink Pilot Time Slot (UpPTS). A UE uses the DwPTS for the initial cell search, synchronization, or channel estimation. A base station uses the UpPTS for channel estimation and synchronizing uplink transmission with a UE. The GP is a period meant for removing interference on a uplink generated due to multi-path delay of a downlink signal between the uplink and a downlink.

A TDD frame includes a Downlink (DL) subframe and a Uplink (UL) subframe. Table 1 illustrates one example of UL-DL configuration in a radio frame.

TABLE 1

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, 'D' represents a DL subframe; 'U' a UL subframe; and 'S' a special subframe. If UL-DL subframe is received from a base station, a UE can know from the radio frame whether each subframe is a DL subframe or a UL subframe.

Figure 3:
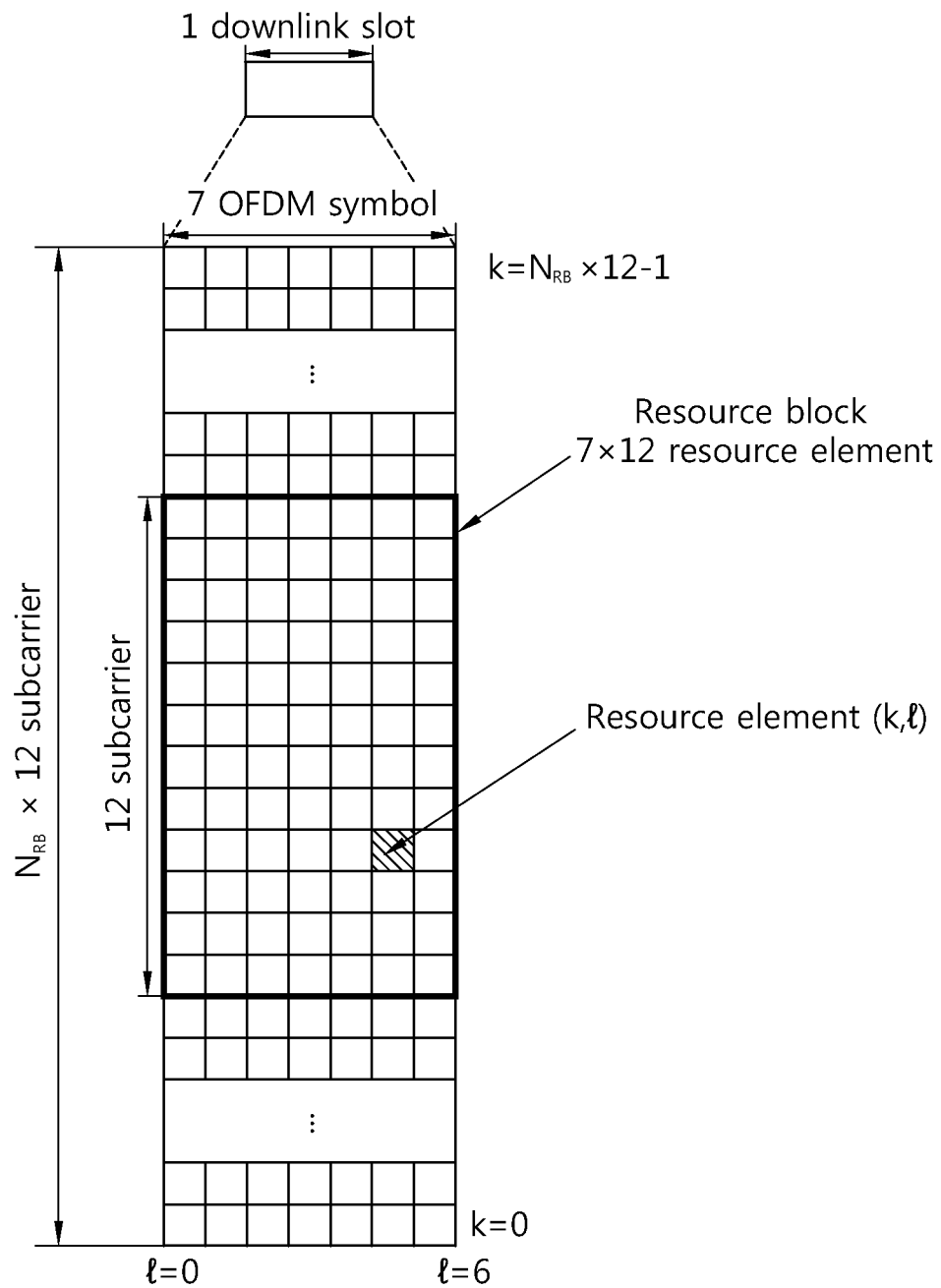
FIG. 3 illustrates one example of a resource grid with respect to a downlink slot.

FIG. 3 illustrates one example of a resource grid with respect to a downlink slot.

With reference to FIG. 3, a downlink slot comprises a plurality of OFDM symbols in the time domain and $N_{RB}$ Resource Blocks (RBs) in the frequency domain. An RB comprises one slot in the time domain as a resource allocation unit and multiple continuous subcarriers in the frequency domain. The number of RBs $N_{RB}$ included in the downlink slot is determined according to the downlink transmission bandwidth configured for a cell. For example, $N_{RB}$ may correspond to a number from 6 to 110 in the LTE system. The structure of a uplink slot can be the same as that of the downlink slot. A uplink slot or a downlink slot can be called a slot for short.

Each element on a resource grid is called a Resource Element (RE). An RE on the resource grid can be identified by an index pair (k, 1) within a slot. At this time, k (k=0, ..., $N_{RB} \times 12-1$) represents a subcarrier index in the frequency domain, and l (l=0, ..., 6) represents an OFDM symbol index in the time domain.

The number of OFDM symbols within a downlink slot and the number of subcarriers can be changed in various ways according to the length of a CP, frequency spacing, and so on. For one OFDM symbol, the number of subcarriers can be chosen from among 128, 256, 512, 1024, 1536, and 2048.

Figure 4:
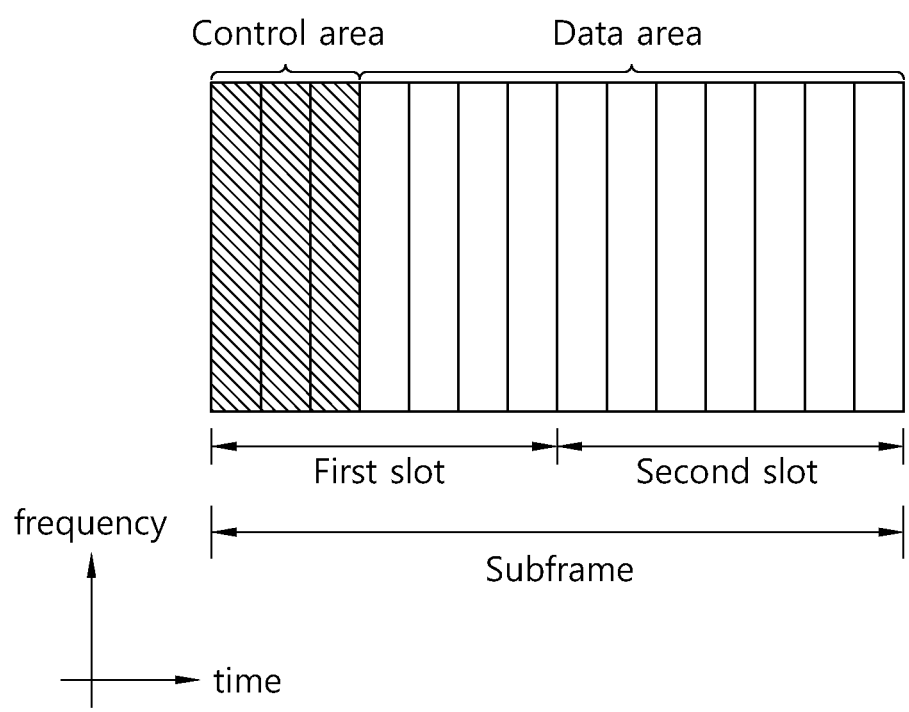
FIG. 4 is an example of a downlink subframe structure in the 3GPP LTE system.

FIG. 4 is an example of a downlink subframe structure in the 3GPP LTE system. A subframe includes two consecutive slots. A maximum of three preceding OFDM symbols in a first slot within the downlink subframe (a maximum of four OFDM symbols depending on situations) correspond to a control region to which a control channel is allocated, and the remaining OFDM symbols correspond to a data region to which a data channel is allocated.

Control channels such as a Physical Downlink Control Channel (PDCCH), Physical Control Format Indicator Channel (PCFICH), and Physical Hybrid ARQ Indicator Channel (PHICH) can be allocated to the control region. A UE can read data transmitted through a control channel by decoding control information transmitted through the PDCCH. The number of OFDM symbols included in the control region of a subframe can be known through the PCFICH. The PHICH carries a Hybrid Automatic Repeat Request (HARQ) Acknowledgement (ACK)/Negative-Acknowledgement (NACK) signal in response to uplink transmission. A Physical Downlink Shared Channel (PDSCH) can be allocated in the data region.

The control information transmitted through the PDCCH is called Downlink Control Information (DCI). DCI transmits uplink scheduling information (which is called a uplink grant); downlink scheduling information (which is called a downlink grant); or control information for indicating uplink power control command, control information meant for paging, and a RACH response.

A plurality of PDCCHs can be transmitted within one subframe, and a UE monitors the plurality of PDCCHs at each subframe. At this time, monitoring refers to attempting decoding of the PDCCH according to the PDCCH format.

Figure 5:
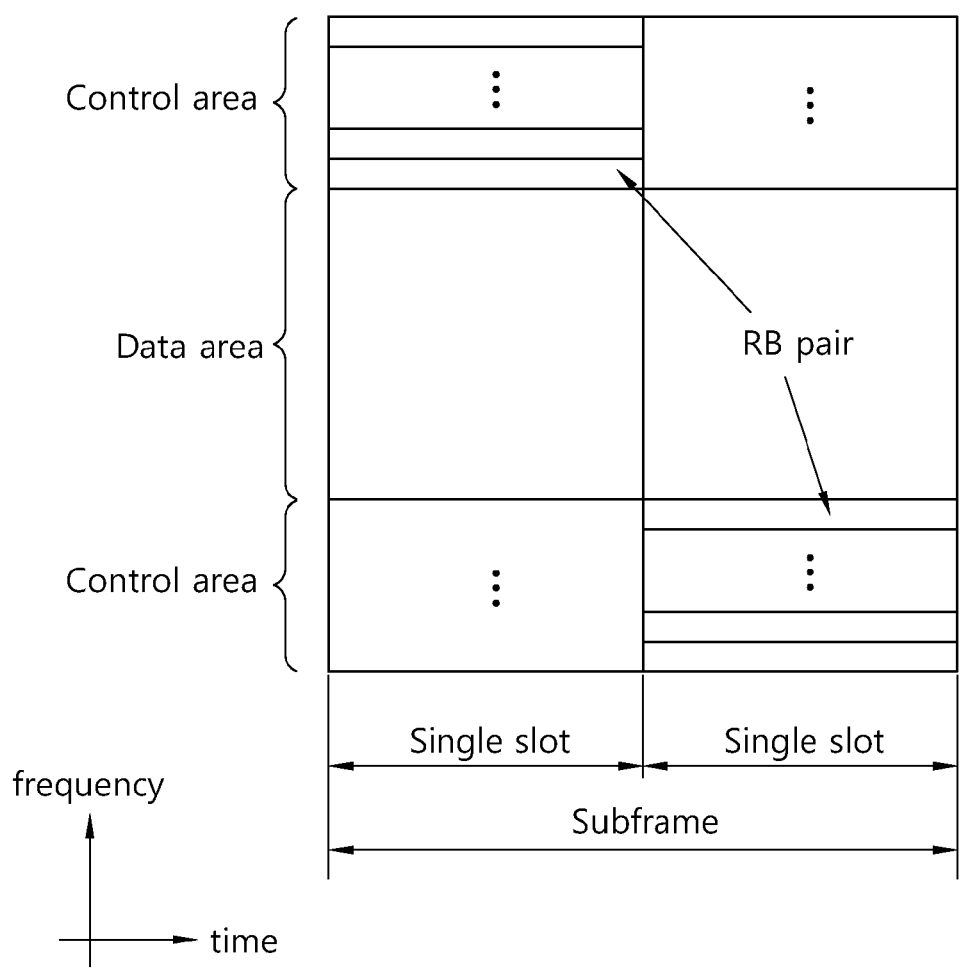
FIG. 5 illustrates a structure of a uplink subframe.

FIG. 5 illustrates a structure of a uplink subframe.

With reference to FIG. 5, a uplink subframe can be divided into a control region and a data region in the frequency domain. In the control region, a Physical Uplink Control Channel (PUCCH) meant for transmitting uplink control channel is allocated. In the data region, a Physical Uplink Shared Channel (PUSCH) meant for transmitting data (control information can be transmitted together depending on situations) is allocated. Depending on configuration, a UE transmit both of the PUCCH and the PUSCH, or either of the two.

A PUCCH with respect to one UE is allocated onto an RB pair in a subframe. RBs belonging to an RB pair occupy different sub-carriers in each of the first and the second slot. The frequency band occupied by the RB belonging to an RB pair allocated to the PUCCH is changed on the basis of slot boundary. This change is described that an RB pair allocated in a PUCCH has been frequency hopped at the slot boundary. A frequency diversity gain can be obtained by transmitting uplink control information through a sub-carrier which differs with time.

HARQ ACK/NACK and Channel Status Information (CSI) representing a downlink channel state such as Channel Quality Indicator (CQI), Precoding Matrix Index (PMI), Precoding Type Indicator (PTI), and Rank Indicator (RI) can be transmitted. Periodic channel state information can be transmitted through the PUCCH.

A PUSCH is mapped onto a transport channel, Uplink Shared Channel (UL-SCH). Uplink data transmitted onto the PUSCH can be a transport block, which is a data block meant for a UL-SCH transmitted during a TTI. The transport block can include user data. In the same manner, the uplink data may be multiplexed data. Multiplexed data may denote a transport block meant for the UL-SCH and channel state information multiplexed with each other. For example, channel state information multiplexed with data may include CQI, PMI, and RI. Also, uplink data may be formed only with channel state information. Periodic or aperiodic channel state information can be transmitted through the PUSCH.

[Carrier Aggregation System]

Figure 6:
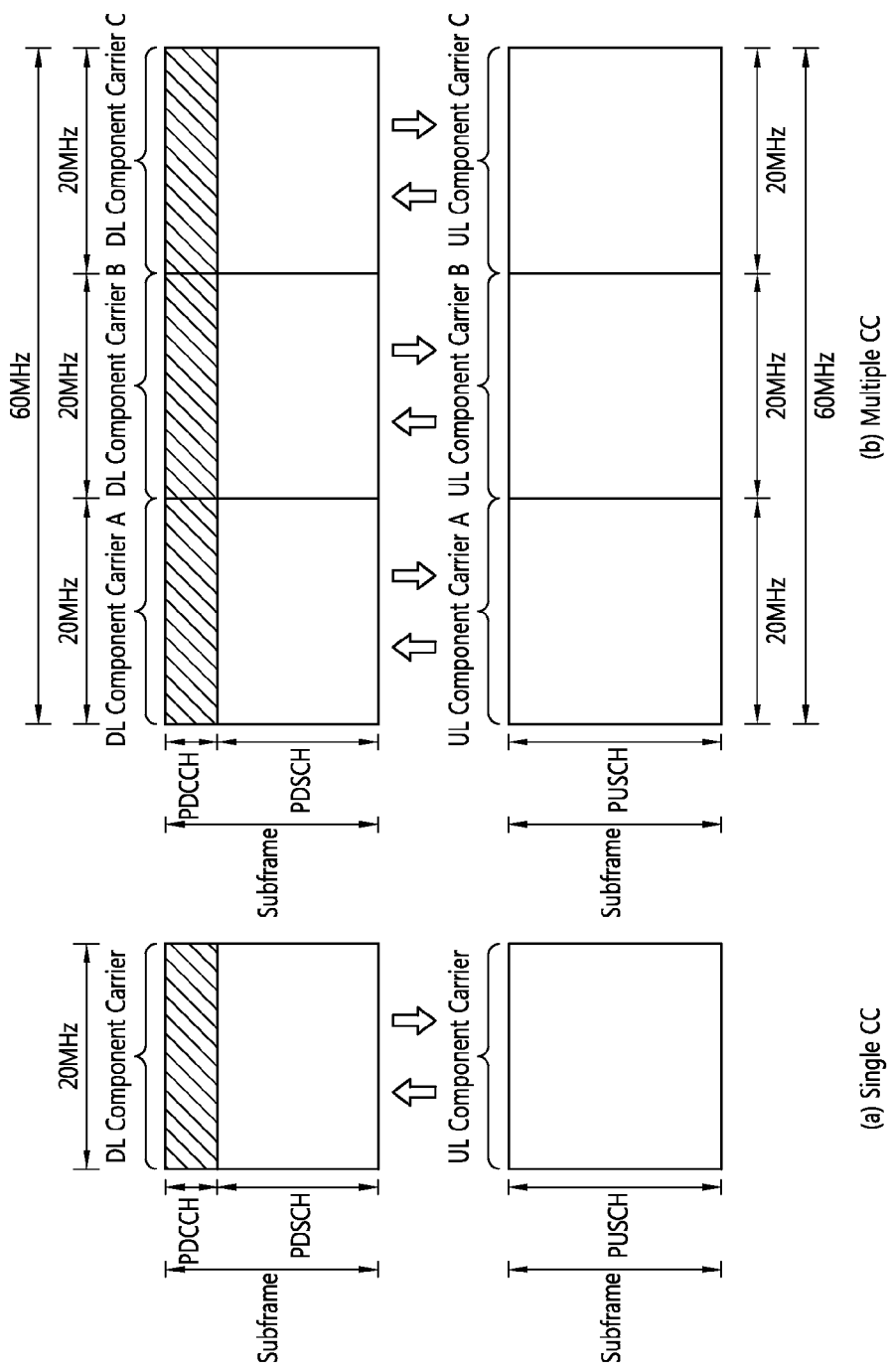
FIG. 6 is an example comparing an existing single carrier system with a carrier aggregation system.

FIG. 6 is an example comparing an existing single carrier system with a carrier aggregation system.

With reference to FIG. 6, a single carrier system allocates only one carrier to a uplink and a downlink of a UE. Bandwidth of the carrier can be varied, but the number of carriers allocated to the UE is one. On the other hand, in a Carrier Aggregation (CA) system, a plurality of component carriers (DL CC A to C, UL CC A to C) can be allocated to the UE. For example, three component carriers of 20 MHz can be allocated to form bandwidth of 60 MHz for the UE.

When more than one component carrier is aggregated, target component carriers may use the same bandwidth used for existing systems to ensure backward compatibility with the existing systems. For example, the 3GPP LTE system supports bandwidth of 1.4 MHz, 3 MHz, 5 MHz, 10 MHz, 15 MHz, and 20 MHz; and the 3GPP LTE-A system can construct broadband of more than 20 MHz by using only the bandwidth of the 3GPP LTE system. Similarly, broadband can be formed by defining new bandwidth without adopting the bandwidth of the existing system.

The system frequency bandwidth of a wireless communication system is described by a plurality of carrier frequencies. A carrier frequency denotes center frequency of a cell. In what follows, a cell may refer to a downlink frequency resource and a uplink frequency resource. Similarly, a cell may denote a combination of a downlink frequency resource and an optional uplink frequency resource. Also, in case carrier aggregation (CA) is not considered, a cell can always have a uplink and a downlink frequency resource as a pair.

To perform transmission and reception of packet data through a particular cell, the UE first has to complete configuration of the particular cell. At this time, configuration refers to the state where reception of system information required for transmitting and receiving data with respect to the corresponding cell is completed. For example, the configuration may include the whole process of receiving common physical layer parameters required for data transmission and reception, MAC layer parameters, or parameters required for a particular operation in the RRC layer. A configuration-completed cell is in a state in which transmission and reception of a packet is allowed immediately once information indicating readiness of the packet data for transmission is received.

A cell in a configuration-completed state may be in an activation or deactivation state. Here, the activation refers to a state in which data is being transmitted or received or a state in which data is ready to be transmitted or received. A UE can monitor or receive a control channel (PDCCH) and a data channel (PDSCH) of an activated cell in order to check resources (which may be frequency, time, etc.) allocated to the UE.

Deactivation refers to a state in which traffic data cannot be transmitted or received, but measurement or the transmission/reception of minimum information is possible. A UE can receive System Information (SI) required to receive packets from a deactivated cell. On the other hand, the UE does not monitor or receive the control channel (PDCCH) and the data channel (PDSCH) of a deactivated cell in order to check resources (which may be frequency, time, etc.) allocated to the UE.

A cell may be classified into a primary cell (Pcell), a secondary cell (Scell), and a serving cell.

The primary cell means a cell that operates in a primary frequency, a cell in which a UE performs an initial connection establishment procedure or a connection re-establishment procedure with a base station, or a cell that is indicated as a primary cell in a handover process.

The secondary cell means a cell that operates in a secondary frequency. The secondary cell is configured once RRC connection is established and used to provide additional radio resources.

The serving cell is formed by a primary cell in the case of a UE in which Carrier Aggregation (CA) has not been configured or to which CA cannot be provided. If CA has been configured for a UE, the term "serving cell" is used to indicate a cell configured for the UE, and the serving cell can be made of a plurality of cells. One serving cell can be formed by one downlink component carrier or a pair of a downlink and a uplink component carrier. A plurality of serving cells can be formed by a set of a primary cell and one or more of the whole secondary cells.

A Primary Component Carrier (PCC) means a Component Carrier (CC) corresponding to a primary cell. A PCC is such a kind of CC through which a UE forms connection or RRC connection with a base station at the early stage from among multiple CCs. A PCC is a special kind of CC that is responsible for connection or RRC connection for signaling with respect to a plurality of CCs and manages UE context, which is connection information related to a UE. Furthermore, a PCC is always in the activation state when the PCC is in an RRC connected mode after being connected to a UE. A downlink CC (DL CC) corresponding to a primary cell is called a downlink Primary Component Carrier (DL PCC), and an uplink CC (UL CC) corresponding to a primary cell is called an uplink Primary Component Carrier (UL PCC).

A Secondary Component Carrier (SCC) means a CC corresponding to a secondary cell. That is, an SCC is a CC allocated to a UE in addition to a PCC and is an extended carrier meant for additional resource allocation. An SCC may be either in the activation or deactivation state. A downlink CC corresponding to a secondary cell is called a downlink Secondary Component Carrier (DL SCC), and a uplink CC corresponding to a secondary cell is called an uplink Secondary Component Carrier (UL SCC).

A primary cell and a secondary cell have the following characteristics.

First, a primary cell is used to transmit a PUCCH. Second, a primary cell is always activated, whereas a secondary cell is activated or deactivated according to specific conditions. Third, when a primary cell experiences a Radio Link Failure (hereinafter referred to as an RLF), RRC re-establishment is triggered. Fourth, a primary cell may be changed by a change of a security key or by a handover procedure accompanying a random access channel (RACH) procedure. Fifth, Non-Access Stratum (NAS) information is received through a primary cell. Sixth, in the case of a FDD system, a primary cell is always formed of a pair of a DL PCC and an UL PCC. Seventh, a different CC may be configured as a primary cell for each UE. Eighth, a primary cell can be replaced only through a handover and a cell selection/reselection process. In adding a new secondary cell, RRC signaling may be used to transmit system information about a dedicated secondary cell.

A DL CC may form one serving cell, or a DL CC and an UL CC may form one serving cell through connection establishment. However, a serving cell is not formed of only one UL CC.

The activation/deactivation of a CC has the same concept as the activation/deactivation of a serving cell. For example, assuming that a serving cell1 is formed of a DL CC1, activation of the serving cell means activation of the DL CC1. Assuming that a serving cell2 is configured through connection establishment of a DL CC2 and an UL CC2, activation of the serving cell2 means the activation of the DL CC2 and the UL CC2. In this sense, each CC may correspond to a cell.

The number of CCs that are aggregated between a downlink and a uplink may be set differently. A case where the number of aggregated DL CCs is the same as the number of aggregated UL CCs is called symmetric aggregation, and a case where the number of aggregated DL CCs is different from the number of aggregated UL CCs is called asymmetric aggregation. Furthermore, the CCs may have different sizes (i.e., bandwidths). For example, assuming that 5 CCs are used to form a 70 MHz band, the 70 MHz band may be configured like 5 MHz CC (carrier #0)+20 MHz CC (carrier #1)+20 MHz CC (carrier #2)+20 MHz CC (carrier #3)+5 MHz CC (carrier #4).

As described above, unlike a single carrier system, a CA system can support a plurality of Component Carriers (CCs). In other words, a CA system can support a plurality of serving cells.

Figure 7:
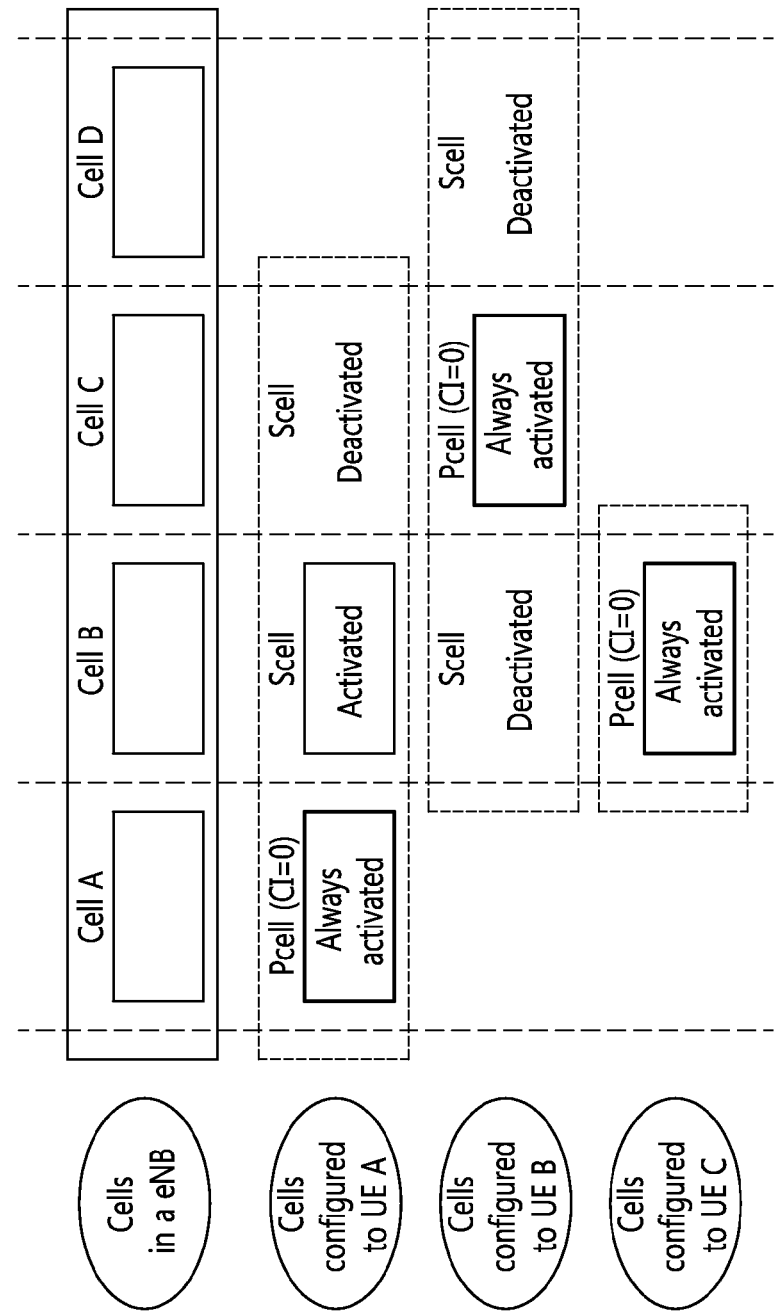
FIG. 7 is an example of configuring a cell in a carrier aggregation system.

FIG. 7 is an example of configuring a cell in a carrier aggregation system.

In FIG. 7, a configured cell means a cell configured for carrier aggregation from among the cell of a base station based on a measurement report. A configured cell is assigned to each UE. A configured cell reserves beforehand resources for ACK/NACK transmission with respect to PDSCH transmission.

Meanwhile, an activated cell means a cell configured to actually transmit PDSCH/PUSCH from among the configured cells. In an activated cell, CSI report for PDSCH/PUSCH transmission and SRS transmission are carried out. A deactivated cell means a cell configured not to transmit PDSCH/PUSCH according to a command of a base station or a timer operation, in which CSI report and SRS transmission are suspended, too.

Regarding the UE A, cell A, B, and C are configured cells, and cell A and B are activated cells. The cell A is used as a primary cell (Pcell), and the cell B is used as a secondary cell (Scell). Regarding the UE B, cell B, C, and D are configured cells, and cell C is an activated cell. In the case of UE C, cell B is a configured cell, and cell B is an activated cell.

[Sounding Reference Signal (SRS)]

An SRS is a reference signal transmitted to a uplink by a UE. An SRS is used for measuring a uplink channel and is a reference signal not associated with transmission of PUSCH and PUCCH.

1. Sequence Generation

An SRS is defined by a base sequence and a cyclic shift. Suppose an SRS sequence is defined as $r_{SRS}^{(\tilde{p})}(n) = r_{u,v}^{(\alpha_{\tilde{p}})}(n)$. Here, u is a PUCCH sequence group number, and v is a base sequence number. The cyclic shift of an SRS sequence $\alpha_{\tilde{p}}$ can be given as shown by the following equation:

$$\alpha_{\tilde{p}} = 2\pi \frac{n_{SRS}^{cs,\tilde{p}}}{8} \quad \text{[Eq. 1]}$$

$$n_{SRS}^{cs,\tilde{p}} = \left(n_{SRS}^{cs} + \frac{8\tilde{p}}{N_{ap}}\right) \bmod 8$$

$$\tilde{p} \in \{0, 1, \ldots, N_{ap} - 1\}.$$

In Eq. 1, $n^{cs}_{SRS} = \{0, 1, 2, 3, 4, 5, 6, 7\}$ is determined by a upper layer parameter. $N_{ap}$ is a number of an antenna port used for SRS transmission.

2. Mapping onto a Physical Resource

An SRS sequence is multiplied with a size scaling factor $\beta_{SRS}$ to meet transmission power $P_{SRS}$. Afterwards, a sequence starting from $r_{SRS}^{(\tilde{p})}(0)$ is mapped onto a resource element (k, l) with respect to an antenna port p as shown by the following equation.

$$a_{2k'+k_0^{(p)},l}^{(p)} = \begin{cases} \frac{1}{\sqrt{N_{ap}}}\beta_{SRS} r_{SRS}^{(\tilde{p})}(k') & k' = 0, 1, \ldots, M_{sc,b}^{RS} - 1 \\ 0 & \text{otherwise} \end{cases} \quad \text{[Eq. 2]}$$

where $k^{(p)}_0$ is a start position of an SRS in the frequency domain; $b=B_{SRS}$; and $M^{RS}_{SC,b}$ represents the length of the SRS sequence, which is given as follows. $B_{SRS}$ is a UE-specific parameter.

$$M_{sc,b}^{RS} = m_{SRS,b} N_{sc}^{RB}/2 \quad \text{[Eq. 3]}$$

where $m_{SRS,b}$ is given as shown in the following table according to each uplink bandwidth $N^{UL}_{RB}$. Table 2 shows SRS bandwidth when $6 \leq N^{UL}_{RB} \leq 40$; Table 3, when $40 < N^{UL}_{RB} \leq 60$; Table 4, when $60 < N^{UL}_{RB} \leq 80$; and Table 5, when $80 < N^{UL}_{RB} \leq 110$.

TABLE 2

| SRS bandwidth configuration $C_{SRS}$ | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

TABLE 3

| SRS bandwidth configuration $C_{SRS}$ | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

TABLE 4

| SRS bandwidth configuration $C_{SRS}$ | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

TABLE 5

| SRS bandwidth configuration $C_{SRS}$ | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

In Tables 2 to 5, a cell-specific parameter "srs-Bandwidth-Config" ($C_{SRS}$) is determined by one of $\{0, 1, 2, 3, 4, 5, 6, 7\}$. A UE-specific parameter "srs-Bandwidth" ($B_{SRS}$) is given by one of $\{0, 1, 2, 3\}$ and configured by a upper layer.

Regarding UpPTS, in case $m_{SRS,0}$ can be re-configured by a cell-specific parameter "srsMaxUpPts" given by a upper layer, $m^{max}_{SRS,0}$ is re-configured by the following equation: $m_{SRS,0}^{max} = \max_{c \in C}\{m_{SRS,0}^c\} \leq (N_{RB}^{UL} - 6N_{RA})$. If the re-configuration is not possible, $m^{max}_{SRS,0} = m_{SRS,0}$. At this time, c represents SRS bandwidth configuration, and $C_{SRS}$ is a set of SRS bandwidth configuration given by Tables 2 to 5. $N_{RA}$ corresponds to a number of format 4 PRACH in a UpPTS.

A start position $k^{(p)}_0$ of an SRS in the frequency domain is defined by the following equation.

$$k_0^{(p)} = \bar{k}_0^{(p)} + \sum_{b=0}^{B_{SRS}} 2M_{sc,b}^{SR} n_b. \quad \text{[Eq. 4]}$$

Regarding a normal uplink subframe, $\bar{k}_0^{(p)}$ of Eq. 4 is defined as follows:

$$\bar{k}_0^{(p)} = (\lfloor N_{RB}^{UL}/2 \rfloor - m_{SRS,0}/2)N_{sc}^{RB} + k_{TC}^{(p)}. \quad \text{[Eq. 5]}$$

And $\bar{k}_0^{(p)}$ with respect to UpPTS is defined as given by the following equation:

$$\bar{k}_0^{(p)} = \begin{cases} (N_{RB}^{UL} - m_{SRS,0}^{max})N_{sc}^{RB} + k_{TC}^{(p)} & \text{if } ((n_f \bmod 2) \cdot (2 - N_{SP}) + n_{hf}) \bmod 2 = 0 \\ k_{TC}^{(p)} & \text{otherwise} \end{cases} \quad \text{[Eq. 6]}$$

$k^{(p)}_{TC}$ is given as shown below:

$$k^{(p)}_{TC} = \begin{cases} 1 - \bar{k}_{TC} & \text{if } n^{cs}_{SRS} \in \{4,5,6,7\} \text{ and } \tilde{p} \in \{1,3\} \text{ and } N_{ap} = 4 \\ \bar{k}_{TC} & \text{otherwise} \end{cases} \quad [\text{Eq. 7}]$$

The index $\tilde{p}$ and an antenna port p has a relationship as shown in the following table.

TABLE 6

| Physical channel or signal | Index $\tilde{p}$ | Antenna port number p as a function of the number of antenna ports configured for the respective physical channel/signal | | |
|---|---|---|---|---|
| | | 1 | 2 | 4 |
| PUSCH | 0 | 10 | 20 | 40 |
| | 1 | — | 21 | 41 |
| | 2 | — | — | 42 |
| | 3 | — | — | 43 |
| SRS | 0 | 10 | 20 | 40 |
| | 1 | — | 21 | 41 |
| | 2 | — | — | 42 |
| | 3 | — | — | 43 |
| PUCCH | 0 | 100 | 200 | — |
| | 1 | — | 201 | — |

In Eq. 7, $\bar{k}_{TC} \in \{0,1\}$, which is given by a UE-specific parameter by a upper layer. $n_b$ is a frequency position index, and the variable $n_{hf}$ is 0 with respect to an UpPTS of a first half-frame while $n_{hf}$ is 1 with respect to an UpPTS of a second helf-frame.

For all of the subframes except for special subframes, an SRS is transmitted from the last symbol of a subframe.

3. SRS Subframe Configuration

An SRS subframe means a subframe to which an SRS is configured to be transmitted. An SRS subframe can be configured by a cell-specific period $T_{SFC}$ and a cell-specific subframe offset $\Delta_{SFC}$. Table 7 below illustrates an example of configuring $T_{SFC}$ and $\Delta_{SFC}$ with respect to a frame structure 1 (FDD frame) and Table 8 illustrates an example of configuring $T_{SFC}$ and $\Delta_{SFC}$ with respect to a frame structure 2 (TDD frame).

TABLE 7

| srs-SubframeConfig | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

TABLE 8

| srs-SubframeConfig | Binary | Configuration Period $T_{SFC}$ (subframes) | Transmission offset $\Delta_{SFC}$ (subframes) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | reserved | reserved |
| 15 | 1111 | reserved | reserved |

Meanwhile, SRS transmission is realized by a type 0 and a type 1 method. The type 0 method transmits an SRS according to a predetermined period, which transmits an SRS according to a period predetermined semi-statically for each UE. The type 1 method transmits an SRS according to aperiodic triggering, where a triggering signal is included in Downlink Control Information (DCI). The type 0 method represents periodic SRS transmission while the type 1 method represents aperiodic SRS transmission. For both of the two methods, an SRS subframe is configured in a cell-specific manner, and a UE is capable of SRS transmission only in the corresponding subframe.

What are described about the SRS above can be found in Section 5.5.3 of the 3GPP TS 36.211 V10.4.0 (2011-12).

[Physical Random Access Channel (PRACH)]

A UE can schedule uplink transmission only after uplink transmission timing is synchronized. PRACH can be used for synchronization of the uplink transmission timing. PRACH can be used when a UE initially connects to a network or loses synchronization with uplink transmission timing.

A UE transmits a random access preamble through the PRACH. A random access preamble consists of a cyclic prefix with a length of $T_{CP}$ and a sequence of a length of $T_{SEQ}$. The preamble format is controlled by a upper layer, and $T_{CP}$ and $T_{SEQ}$ according to the preamble format are shown in Table 9.

TABLE 9

| Preamble format | $T_{CP}$ | $T_{SEQ}$ |
|---|---|---|
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 | $448 \cdot T_s$ | $4096 \cdot T_s$ |

If it is triggered in the Medium Access Control (MAC) layer, transmission of a random access preamble is carried out with particular time and frequency resources. The resources are determined in an ascending order of subframe numbers within a radio frame. An index 0 is assigned to a physical resource block having the smallest number. PRACH resource is specified by a PRACH resource index.

In a radio frame type 1 (FDD frame), preamble format 0 to 3 are used, and at most one random access resource is allocated to each subframe.

In a radio frame type 2 (TDD frame), preamble format 0 to 4 are used, and a plurality of random access resources can be allocated to one UL subframe.

A first physical resource block $n^{RA}_{PRB}$ for PRACH transmission is defined as $n^{RA}_{PRB\ offset}$, and $n^{RA}_{PRB\ offset}$ is represented by a physical resource block number which satisfies the condition that $0 \leq n^{RA}_{PRB\ offset} \leq N^{UL}_{RB} - 6$. $N^{UL}_{RB}$ is the number of uplink resource blocks.

Frequency multiplexing with respect to preamble format 0 to 3 can be given by the following equation.

$$n^{RA}_{PRB} = \begin{cases} n^{RA}_{PRBoffset} + 6\left\lfloor \frac{f_{RA}}{2} \right\rfloor, & \text{if } f_{RA} \bmod 2 = 0 \\ N^{UL}_{RB} - 6 - n^{RA}_{PRBoffset} - 6\left\lfloor \frac{f_{RA}}{2} \right\rfloor, & \text{otherwise} \end{cases} \quad [\text{Eq. 8}]$$

where $f_{RA}$ is a frequency resource index at a predetermined time point.

Frequency multiplexing with respect to the preamble format 4 can be given by the following equation.

$$n^{RA}_{PRB} = \quad [\text{Eq. 9}]$$
$$\begin{cases} 6 f_{RA}, & \text{if } ((n_f \bmod 2) \times (2 - N_{SP}) + t^{(1)}_{RA}) \bmod 2 = 0 \\ N^{UL}_{RB} - 6(f_{RA} + 1), & \text{otherwise} \end{cases}$$

where $n_f$ is a system frame number, and $N_{SP}$ represents the number of switch points from a downlink to a uplink within a radio frame. $t^{(1)}_{RA}$ is 0 or 1, and indicates whether a random access resource is located at the first half-frame or second half-frame.

From now on, the present invention is described.

Different from the LTE system, in the LTE-A system, a UE can transmit and receive data/control information by using multiple cells. A UE uses an initially connected cell as a primary cell and a cell configured additionally through the primary cell as a secondary cell.

As described above, a primary cell is used for an operation to maintain connection between a base station and a UE. For example, in a primary cell, an operation such as Radio Link Management (RLM), Radio Resource Management (RRM), reception of system information, PRACH transmission, and transmission of a uplink control channel (PUCCH) can be carried out. On the other hand, a secondary cell is used mostly for transmission of scheduling information about a data channel or transmission of the data channel.

A primary cell and a secondary cell are UE-specific. When a plurality of cells is defined in a system, each cell can be used as a primary cell or a secondary cell; and each UE uses one of the plurality of cells as a primary cell. At this time, all of the cells are configured to carry out the operation of the primary cell. In other words, all of the cells are made to implement transmission of a synchronization signal, transmission of a broadcast channel, transmission of CRS, configuration of a PDCCH region, and so on. Such a kind of cells may be called backward compatible cells or Legacy Carrier Types (LCTs).

In a future wireless communication system, being considered is adoption of a cell from which part or the whole of unnecessary information of a secondary cell is removed. Such a cell may be described not to provide backward compatibility and called a New Carrier Type (NCT) or an extension carrier.

For example, an NCT, instead of transmitting a CRS at each subframe, can transmit the CRS only for part of time or frequency intervals. A DL control channel region such as an existing PDCCH may be removed or confined to part of time or frequency intervals. A DL control channel region specialized for each UE can be newly configured.

In the case of a UL carrier corresponding to a DL NCT used mostly as a secondary cell, transmission of a PUCCH may not be supported. In that case, PUSCH transmission is supported across the whole band of the UL carrier, and for effective scheduling of an RB, UL channel sounding with respect to the whole frequency band is necessary so that UL channel information with respect to the whole frequency band can be obtained. In case DL-UL channel reciprocity of TDD is utilized, the UL channel sounding with respect to the whole frequency band may be needed to perform effective DL scheduling.

However, frequency band configuration for an SRS in the existing LTE channel has been designed by assuming PUCCH transmission. As a result of the assumption, it is often the case that an SRS is not transmitted in some part (usually a boundary area of the system frequency band) of the system frequency band to which the PUCCH is scheduled to be transmitted.

For example, in the case where the system frequency band is 100 RB (20 MHz), the maximum SRS frequency band supported by the LTE becomes 96 RB. In this case, SRS transmission is impossible in both of the boundary areas of the system frequency band each occupying 2 RBs.

Meanwhile, in the LTE system, an SRS can be transmitted in a UpPTS to which a PUCCH is not transmitted. For a UpPTS to which a PUCCH is not transmitted, transmission of an SRS may be needed across the whole system frequency band. However, there is the chance that the frequency band for SRS transmission defined by the LTE specifications is smaller than the system frequency band. To solve such a problem, the LTE system employs shifting of SRS.

Figure 8:
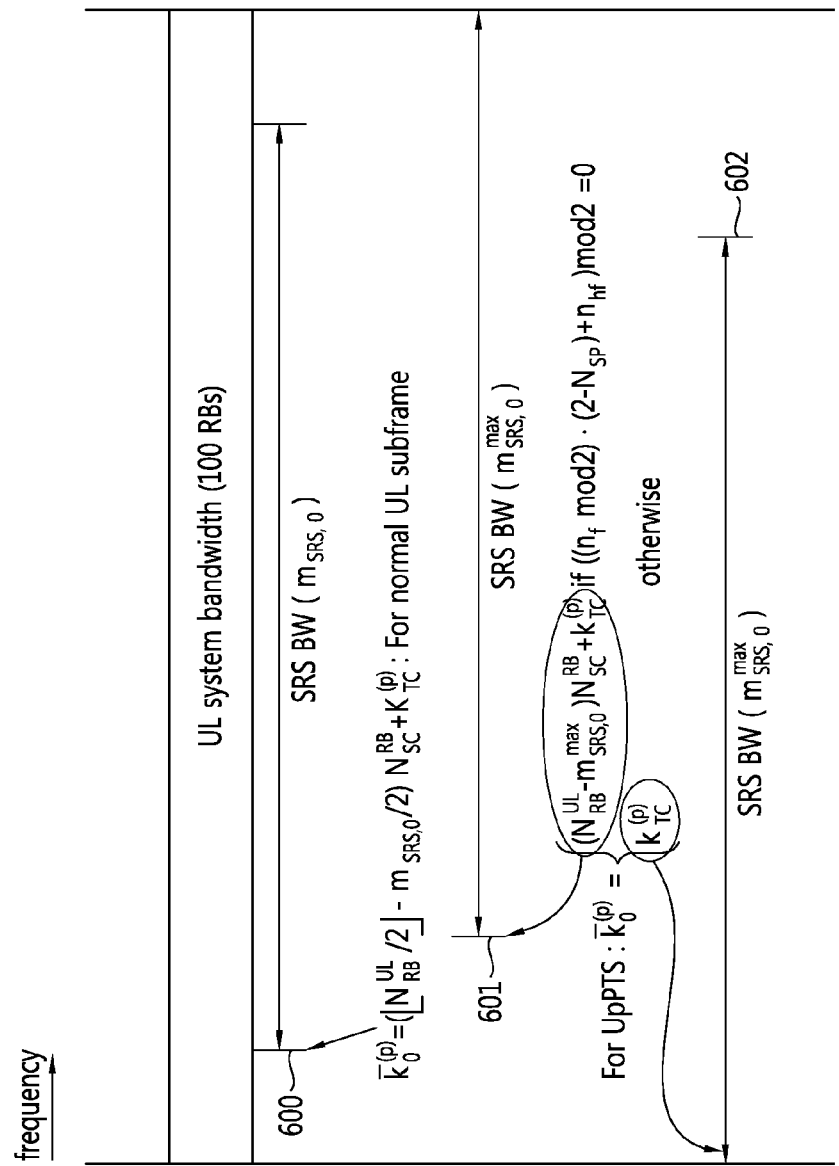
FIG. 8 illustrates one example of shifting an SRS in the system frequency band of a TDD frame.

FIG. 8 illustrates one example of shifting an SRS in the system frequency band of a TDD frame.

With reference to FIG. 8, an SRS frequency band to which an SRS is transmitted may be $m_{SRS,0}$ in the case of a normal subframe. At this time, the SRS frequency band is disposed at the center of the system frequency band as indicated by 600 of FIG. 8. This disposition is intended to avoid collision with a PUCCH transmitted through both of the boundary areas of the system frequency band.

On the other hand, in a UpPTS to which a PUCCH is not transmitted, an SRS frequency band is shifted from the center of the system frequency band 601, 602. For example, in a UpPTS belonging to a first half-frame of a radio frame, an SRS frequency band is shifted to the right as indicated by 601 (which is called right-shift for short); in a UpPTS belonging to a second half-frame, the SRS frequency band can be shifted to the left as indicated by 602 (which is called left-shift for short). Then, within one radio frame, an SRS can be transmitted across the whole of the system frequency band.

However, the conventional method as described above works only when the same frequency band and the same UL-DL configuration are applied to neighboring base stations and subframes to which a UpPTS is applied are set up in the same time interval. In other words, this scheme is possible since all of the neighboring base stations do not perform PUCCH transmission in a subframe of the corresponding frequency band.

If neighboring base stations use different UL-DL configuration from each other, neighboring base stations experience interference. For example, suppose there are neighboring base stations A and B and a UE A and B are located in the cell boundary of the base station A and in the cell boundary of the base station B, respectively. In this case, if UL-DL configurations are different between the base station A and B, the UE A connected to the base station A in a particular subframe can perform uplink transmission, and the UE B connected to the base station B can perform downlink reception. If the UE A and B are located in a neighboring area while the UE B performs downlink reception, the downlink reception of the UE B can be blocked due to uplink transmission of the UE A. Similarly, if the UE A transmits an SRS across the whole frequency band and the UE B transmits a PUCCH, the base station B may encounter a problem in receiving the PUCCH due to interference even if the UE A and B perform uplink transmission at the same time.

As described above, a problem may occur not only for a case where neighboring base stations operate in a TDD mode and employ different UL-DL configurations from each other but also for a case where the neighboring base stations employ different types of carriers.

Figure 9:
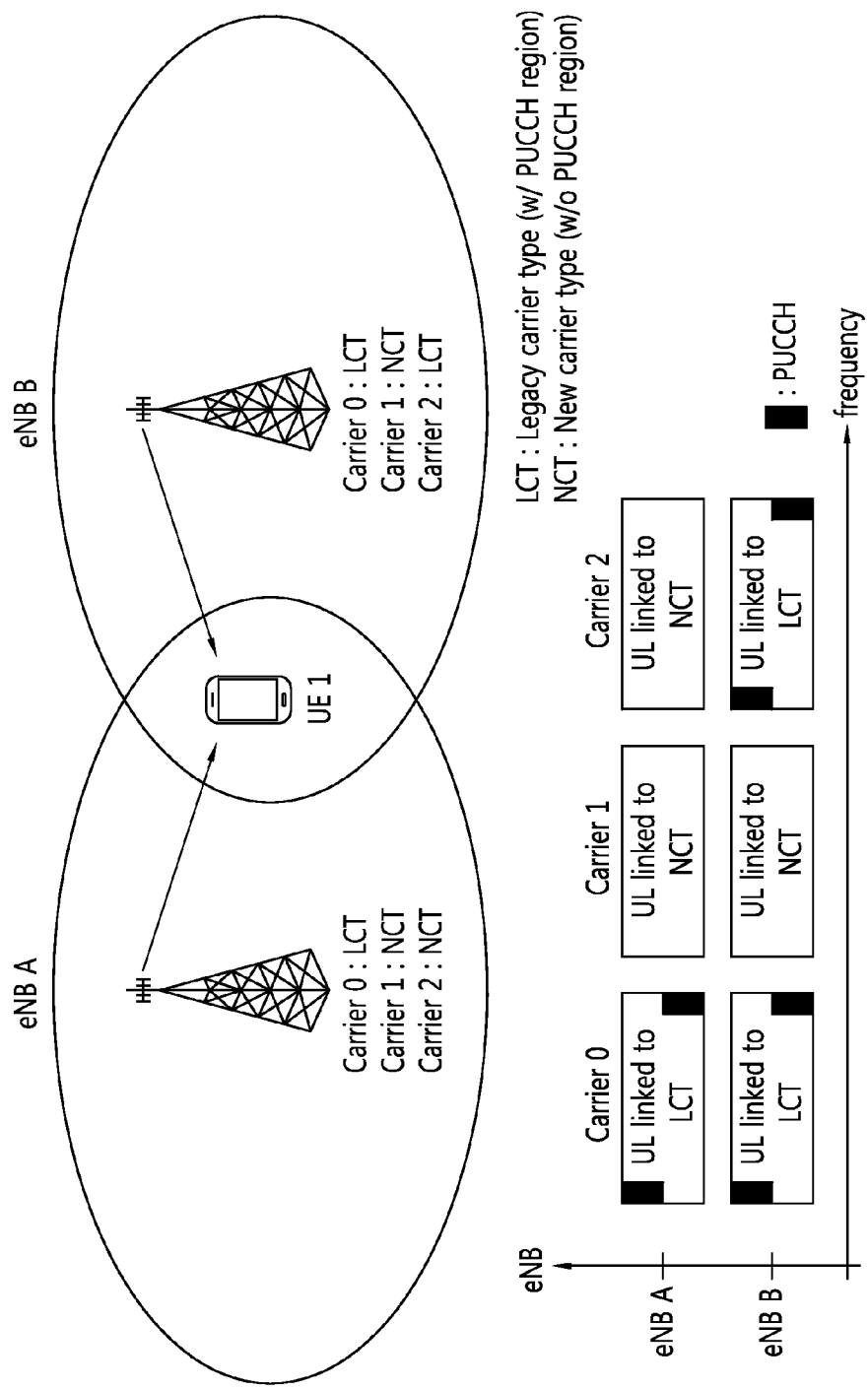
FIG. 9 illustrates a case where neighboring base stations use carriers different from one another.

FIG. 9 illustrates a case where neighboring base stations use carriers different from one another.

For a base station A, carrier 0 is LCT, and carrier 1, 2 are NCT. For a base station B, carrier 0 is LCT; carrier 1 is NCT; and carrier 2 is LCT. In other words, there are times the base station A and B employ the same type of carrier (for example, NCT) with respect to the same frequency (for example, carrier 1) between neighboring base stations; and the base station A and B employ different types of carriers with respect to the same frequency (for example, carrier 2).

In the above example, in case carrier 1 is NCT, it is preferable to configure the base station A so that a UL carrier linked to the carrier 1 can transmit an SRS across the whole frequency band. On the other hand, it is not preferred to configure an SRS across the whole frequency band in the case of a UL carrier linked to the carrier 2 even if the carrier 2 is NCT. This is so because, since the carrier 1 of the base station B is NCT, a UL carrier linked to the carrier 1 does not perform PUCCH transmission and thus interference does not occur; however, since the carrier 2 is LCT, the carrier 2 may cause interference on the PUCCH reception through a UL carrier linked to the carrier 2 of the base station B.

Also, in a future wireless communication system, a random access process may be introduced to the NCT to operate the NCT alone. In this case, a UL carrier corresponding to the NCT may deal with transmission of a PUCCH.

In other words, in a UL carrier corresponding to DL NCT, the present invention can configure an SRS frequency band by using one of 1) a method which takes into account a PUCCH region and 2) a method for configuring an SRS frequency band across the whole frequency band.

Figure 10:
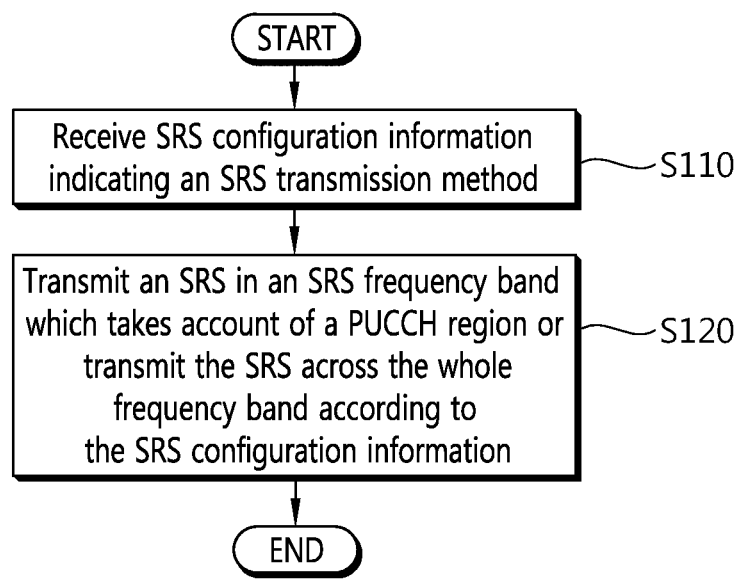
FIG. 10 illustrates an SRS transmission method according to one embodiment of the present invention.

FIG. 10 illustrates an SRS transmission method according to one embodiment of the present invention.

A UE receives SRS configuration information indicating an SRS transmission method from a base station S110. SRS configuration information can specify either of the methods 1 and 2 to be described later. A base station can determine in a cell-specific manner which method to be used and inform about the determination through SRS configuration information. SRS configuration information can be either broadcast or signaled by RRC.

A UE can transmit an SRS in an SRS frequency band which takes account of a PUCCH region according to SRS configuration information or transmit an SRS across the whole frequency range S120.

In what follows, the methods 1 and 2 will be described in more detail.

1) Method 1: A Configuration Method which Takes Account of a PUCCH Region

Method 1 is a method for configuring SRS transmission which takes account of a PUCCH region. In the same manner for configuring an SRS frequency band in a normal subframe, the method uses the maximum SRS frequency band configured according to the system frequency band as a frequency band available for SRS transmission, where the maximum SRS frequency band is located at the center of the system frequency band.

In other words, the method uses the maximum SRS frequency band (namely, $m_{SRS,0}$) allowed for SRS configuration according to Tables 2 to 5, but the maximum SRS frequency band is located at the center of the system frequency band.

2) Method 2: A Method for Configuring the Whole Frequency Band of a UL Carrier as a Frequency Band for SRS Transmission Method 2 is a method for configuring SRS transmission which uses the whole frequency band. The method configures the maximum SRS frequency band (namely, $m_{SRS,0}$) allowed for SRS configuration or an SRS frequency band as a frequency band available for SRS transmission as in a UpPTS, where the configured frequency bands are shifted from disparate subframes to make the whole frequency band available for SRS transmission. For example, in the case of a UL carrier, the maximum SRS frequency band of Tables 2 to 5 is left-shifted in a first subframe, and the maximum SRS frequency band is right-shifted in a second subframe. The first and the second subframe are not limited to a special subframe and can be a normal subframe. The first and the second subframe can be different subframes within the same frame.

In the case of a UpPTS, the maximum SRS frequency band is signaled by an RRC parameter, "srs-MaxUpPTS", and in the case of NCT, an RRC parameter such as "srs-MaxNCT" can be introduced. This kind of parameter can be used for FDD. The maximum SRS frequency band configured by an RRC parameter can be used for transmission of an SRS across the whole frequency band through shifting of the SRS frequency band.

Meanwhile, method 2 can be made to always use $m_{SRS,0}$ to configure the maximum SRS frequency band without considering PRACH. $m_{SRS,0}$, which is used to configure the maximum SRS frequency band in the same manner as in the method 1, is left- or right-shifted to allow transmission of an SRS across the whole frequency band. This scheme is useful when the NCT is used only as a secondary cell and PRACH transmission for Timing Advance (TA) is not required. In this case, $N_{RA}$ can be set to 0 ($N_{RA}=0$).

In case the method 2 configures an SRS frequency band taking account of PRACH as the maximum SRS frequency band (mmaxSRS, 0) (namely, $m_{SRS,0}^{max}=\max_{c \in C}\{m_{SRS,0}^{c}\} \le (N_{RB}^{UL}-6N_{RA})$), resources of the PRACH can be allocated first to both ends of the frequency band as in the frequency multiplexing of PRACH when PRACH preamble format 4 is used. PRACH resources in a UpPTS where PUCCH does not exist are configured to be allocated first to both ends of the frequency band for efficient resource configuration. In particular, SRS frequency band which takes account of PRACH can be used for the case of transmitting the PRACH through a UL carrier corresponding to a DL NCT to multiple Timing Advance Groups (TAGs). Even if the PRACH preamble format 0 to 3 are used, frequency multiplexing of PRACH can be configured to be used first for both ends of the system frequency band.

In case shifting of an SRS frequency band such as the method 2 is used, left-shift and right-shift can be made to alternate in the subframes capable of transmitting an SRS specified by SRS subframe configuration, which can be selected in a cell-specific manner. If left/right shift configuration is changed with respect to the same subframe number in each frame, left/right shift configuration can be determined according to a System Frame Number (SFN). For example, if SFN is an even number, left-shift can be chosen, while if SFN is an odd number, right-shift can be used. This kind of rule may be needed for a case where the number of subframes capable of transmitting an SRS is an odd number within one frame.

SRS configuration information indicating one of the methods 1 and 2 can be applied commonly to a periodic and an aperiodic SRS, or signaled separately thereto.

Meanwhile, in the case of PUSCH scheduled in a frequency band available for SRS transmission, to avoid collision with an SRS, an RB belonging to the frequency band available for SRS transmission performs rate matching (in other words, PUSCH transmission is not carried out) at the last symbol of a subframe to which the SRS is configured to be transmitted.

Depending on whether a frequency band available for SRS transmission is located at the center of the system frequency band; or left- or right-shifted, the position of the RB which performs rate matching can be changed. To reduce such complexity, in the UL NCT, rate matching can be carried out with respect to the system frequency band irrespective of shifting of an SRS frequency band. This can be applied to a cell-specific SRS transmission subframe.

In case the NCT uses a method for configuring a transmission frequency band of PRACH first for both ends of a frequency band as in frequency multiplexing of PRACH preamble format 4 for the sake of efficiency of PRACH transmission resources, selection of an SRS frequency band can be configured similarly to the condition $m_{SRS,0} = \max_{c \in C}\{m_{SRS,0}^c\} \leq (N_{RB}^{UL} - 6N_{RA})$ so that the SRS frequency band can avoid collision with the PRACH regions at both ends of the system frequency band.

At this time, different from the method 2, instead of applying left/right-shift, the SRS frequency band can be located at the center of the system frequency band similar to the method 1. In case $N_{RA}$ is an odd number, PRACH resources are allocated at one end of both boundaries; in the case of an even number, PRACH resources are allocated to both boundaries of the system frequency band. In case $N_{RA}$ is an odd number, too, an SRS frequency band can be configured by taking account of PRACH resources at both boundaries of the system frequency band.

The SRS frequency band taking account of PRACH resources can be determined as follows.

$$m_{SRS,0}^{max} = \max_{c \in C}\{m_{SRS,0}^c\} \leq (N_{RB}^{UL} - 12\lceil N_{RA}/2 \rceil) \quad \text{[Eq. 10]}$$

The value of $N_{RA}$ in the NCT may be limited to an even number.

In the case of UL NCT where PUCCH transmission is not needed, the SRS frequency band can be limited to always belong to the same TAG as a primary cell. In case UL NCT and the primary cell are allowed to belong to different TAGs from each other, UL NCT can be limited to belong to the same TAG as a different secondary cell so that the UL NCT can avoid PRACH transmission.

A method for multiplexing frequency band of PRACH by taking account of an SRS transmission frequency band and a method for configuring an SRS frequency band by taking account of PRACH may not be limited to an existing form of PRACH. The same technical principles can be applied to a UL subframe/carrier through which a preamble (for example, a discovery signal which can be used for Device-to-Device (D2D) communication among UEs) meant for detecting a UE is transmitted. Also, the present invention can be generalized so that it can be applied to a method for transmitting a particular UL channel and avoiding collision with an SRS.

The method 1 and 2 can be applied for each subframe. In other words, configuration of SRS transmission (method 1) except for PUCCH region is applied to part of SRS transmission subframes, and configuration of SRS transmission across the whole frequency band (method 2) can be applied to the remaining SRS transmission subframes. Configuration of the respective subframes as described above is carried out according to a predetermined rule or determined through signaling. For example, in the case of a subframe with an odd number, SRS transmission is configured across the whole frequency band. Even in the case of FDD mode, SRS transmission configuration across the whole frequency band is carried out only for No. 1 subframe or No. 1 and 6 subframe to which an existing UpPTS belongs.

In the case of a periodic SRS, configuration of SRS transmission can be fixed to exclude a PUCCH region (it should be noted that UpPTS in the TDD mode can be made to configure SRS transmission across the whole frequency band as in the prior art) while in the case of an aperiodic SRS, configuration of SRS transmission can be fixed to the whole frequency band.

A base station can command a UE to choose between the method 1 and 2 by taking account of the type of carrier used by neighboring base stations. For example, as shown in FIG. 9, suppose base stations A and B each use aggregation of DL carriers 0, 1, and 2. Further suppose that each DL carrier has a UL carrier linked thereto.

At this time, the base station A can use a DL carrier 0 as LCT and DL carrier 1 and 2 as NCT. On the other hand, the base station B can use DL carrier 0 and 2 as LCT and only the DL carrier 1 as NCT.

The base station A and B can know types of carriers through a network. In this case, the base station A can command a UE connected thereto that an SRS is transmitted across the whole frequency band through a UL carrier linked to a DL carrier 1; and an SRS is transmitted to a frequency band which takes account of a PUCCH region through a UL carrier linked to a DL carrier 2.

In case the UE is located in the boundary region between the base station A and B, transmission of an SRS across the whole frequency band through the carrier 2 exerts an influence on the PUCCH transmitted by a UE connected to the base station B. According to the present invention, interference on neighboring cells can be reduced compared with a method for determining a transmission frequency band of an SRS simply according to the type of carrier.

A method for transmitting an SRS across the whole frequency band by using an aperiodic SRS can use left/right-shift of the SRS frequency band. Also, the method can configure transmitting an aperiodic SRS through aperiodic SRS triggering with respect to a frequency band not covered by configuration of SRS transmission excluding a PUCCH region.

Figure 11:
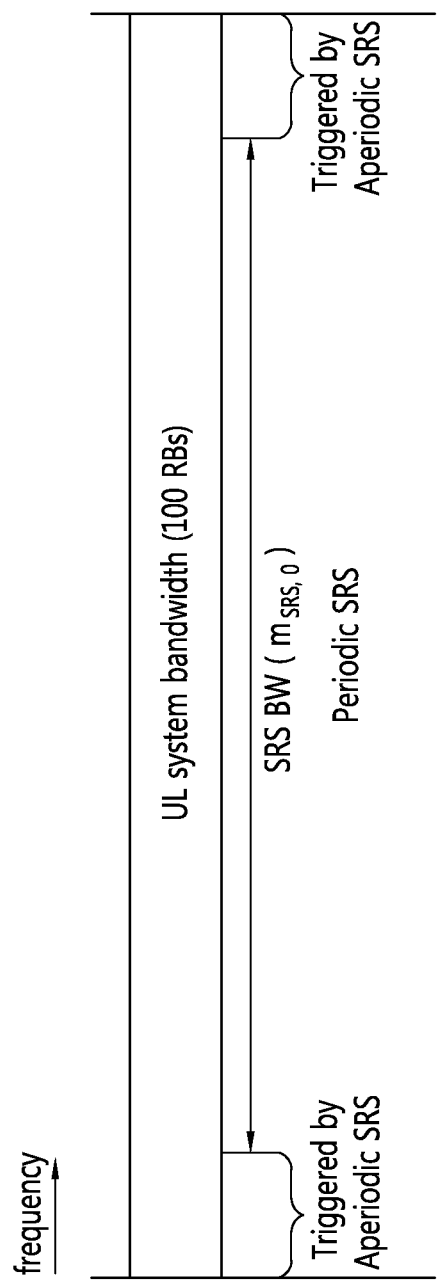
FIG. 11 illustrates an example of a frequency band in which a periodic SRS and an aperiodic SRS are transmitted.

FIG. 11 illustrates an example of a frequency band in which a periodic SRS and an aperiodic SRS are transmitted.

With reference to FIG. 11, a base station configures so that a periodic SRS can be transmitted in a first subframe of NCT and an aperiodic SRS can be transmitted in a second subframe. The first and second subframe can be different subframes from each other in the same frame, or can be the same subframe.

At this time, a periodic SRS can be transmitted in the middle of a system frequency range. In case a transmission frequency band of a periodic SRS is smaller than the system frequency band, a base station can perform triggering so that a UE can transmit an aperiodic SRS in a frequency band to which a periodic SRS is not transmitted.

The base station can specify directly by using a field of a PDCCH regarding which one to choose between left- and right-shift. Choosing either left- or right-shift can be associated with a subframe. For example, based on a number of a subframe to which the PDCCH including information for triggering SRS transmission is transmitted, which one to choose between left- and right-shift can be associated, or choosing either left- or right-shift can be associated with a number of the subframe to which a UE transmits an SRS.

In the case of a subframe configured in a cell-specific manner so that an SRS can be transmitted by aperiodic SRS triggering to avoid collision between SRS transmission and a PUSCH, rate matching can be performed for the PUSCH across the whole frequency band of the last symbol of the subframe.

When an SRS frequency band is located at the center, left-, and right-shift of the system frequency band, a target RB of SRS transmission due to hopping can be changed. If the hopping is configured independently of location in the frequency band, there may be RBs skipped by the hopping. Therefore, the hopping may be carried out separately for each location of the RB in the corresponding SRS frequency band. At this time, a method which makes hopping patterns identical to each other but only increases a hopping index can be employed.

The present invention can perform effective configuration of a frequency band for SRS transmission according to deployment of NCT cells.

Figure 12:
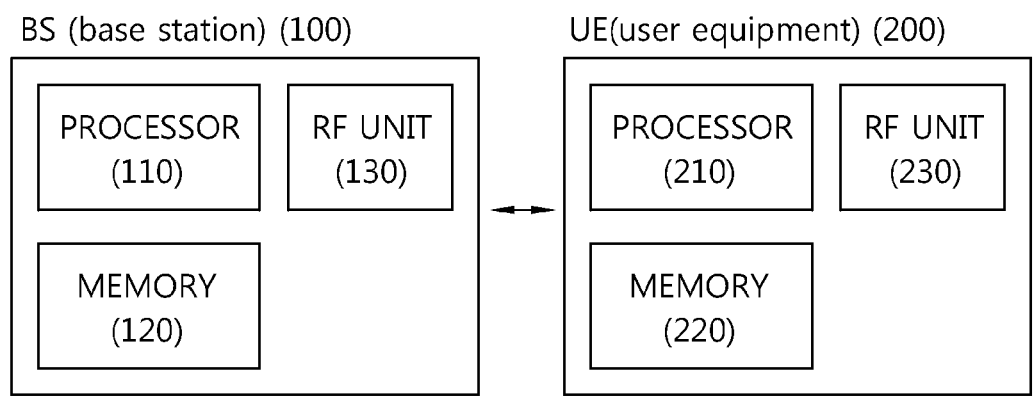
FIG. 12 illustrates a composition of a base station and a user equipment according to an embodiment of the present invention.

FIG. 12 illustrates a composition of a base station and a user equipment according to an embodiment of the present invention.

A base station 100 comprises a processor 110, memory 120, and Radio Frequency (RF) unit 130. The processor 110 implements a proposed function, process and/or method. For example, the processor 110 transmits SRS configuration information indicating an SRS transmission method with respect to a particular carrier and receives an SRS. The processor 110 can measure a uplink channel by using an SRS and use the measurement for scheduling. The memory 120, being connected to the processor 110, stores various kinds of information needed to operate the processor 110. The RF unit 130, being connected to the processor 110, transmits and/or receives a radio signal.

The UE 200 comprises a processor 210, memory 220, and RF unit 230. The processor 210 implements a proposed function, process and/or method. For example, the processor 210 receives SRS configuration information from a base station and transmits an SRS by using an SRS transmission method according to the received SRS configuration information. The memory 220, being connected to the processor 210, stores various kinds of information needed to operate the processor 210. The RF unit 230, being connected to the processor 210, transmits and/or receives a radio signal.

The processor 110, 210 can include Application-Specific Integrated Circuit (ASIC), other chipsets, logical circuit, and/or a data processing module. The memory 120, 220 can include Read-Only Memory (ROM), Random Access Memory (RAM), flash memory, memory card, storage medium, and/or other storage module. The RF unit 130, 230 can include a baseband circuit to process a radio signal. In case the embodiments are implemented by software, the techniques described above can be implemented in the form of a module (procedure, function, and the like) carrying out the functions described above. A module can be stored in the memory 120, 220 and run by the processor 110, 210. The memory 120, 220 can be installed inside or outside the processor 110, 210 and can be connected to the processor 110, 210 through various well-known means.

What is claimed is:

1. A method for transmitting a Sounding Reference Signal (SRS) in a wireless communication system, comprising:
   receiving SRS configuration information indicating an SRS transmission method with respect to an uplink carrier; and
   transmitting an SRS according to the SRS transmission method determined based on the SRS configuration information,
   wherein the SRS transmission method includes a first SRS transmission method using a frequency band of the uplink carrier to transmit the SRS or a second SRS transmission method using a part of the frequency band of the uplink carrier to transmit the SRS, and
   wherein the first SRS transmission method is determined for the SRS transmission if a periodic SRS is configured, and the second SRS transmission method is determined for the SRS transmission if an aperiodic SRS is configured, and
   wherein, if the SRS is transmitted using the second SRS transmission method, the SRS is transmitted in a first frequency band formed by shifting the part of the frequency band in a first subframe, and the SRS is transmitted in a second frequency band formed by shifting the part of the frequency band in a second subframe.

2. The method of claim 1, wherein, if the uplink carrier consists only of an uplink data channel from between an uplink control channel and the uplink data channel, the first SRS transmission method is determined for the SRS transmission.

3. The method of claim 1, wherein, if the SRS is transmitted using the first SRS transmission method, the part of the frequency band is located at the center of the whole frequency band.

4. The method of claim 1, wherein a union of the first and the second frequency band is the same as the whole frequency band.

5. The method of claim 1, wherein the SRS configuration information further include information indicating either of the first and the second frequency band with respect to each subframe.

6. A user equipment, comprising:
   an Radio Frequency (RF) unit transmitting and receiving a radio signal; and
   a processor connected to the RF unit, where
   the processor receives SRS configuration information indicating an SRS transmission method with respect to an uplink carrier; and
   transmits an SRS according to the SRS transmission method determined based on the SRS configuration information,
   wherein the SRS transmission method includes a first SRS transmission method using a frequency band of the uplink carrier to transmit the SRS or a second SRS transmission method using a part of the frequency band of the uplink carrier to transmit the SRS, and wherein the first SRS transmission method is determined for the SRS transmission if a periodic SRS is configured, and the second SRS transmission method is determined for the SRS transmission if an aperiodic SRS is configured, and wherein, if the SRS is transmitted using the second SRS transmission method, the SRS is transmitted in a first frequency band formed by shifting the part of the frequency band in a first subframe, and the SRS is transmitted in a second frequency band formed by shifting the part of the frequency band in a second subframe.

* * * * *